March 26, 1929.  V. S. McDONOUGH  1,707,128
GREASE CUP
Filed Jan. 18, 1928   2 Sheets-Sheet 1
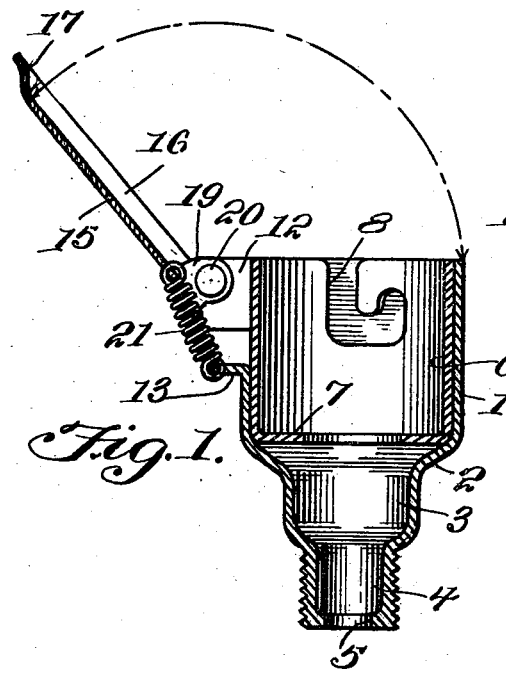
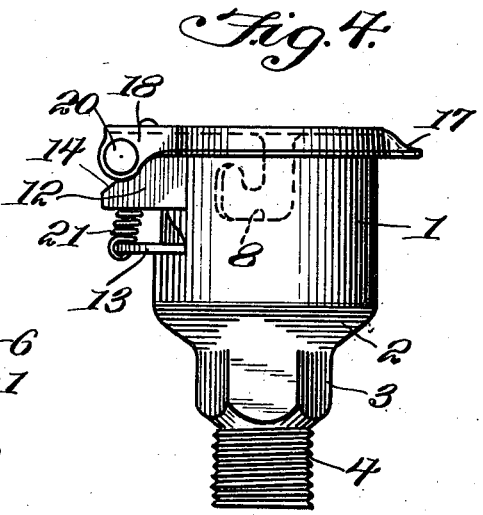
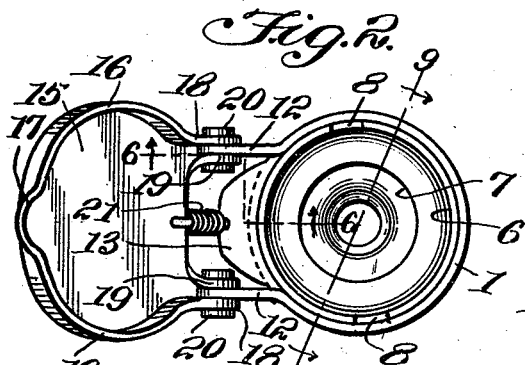
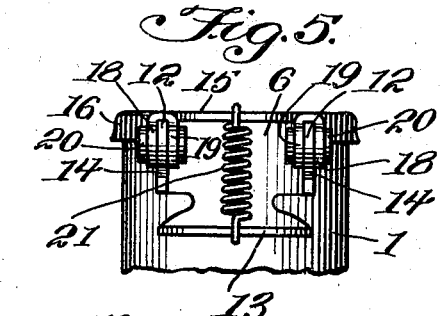
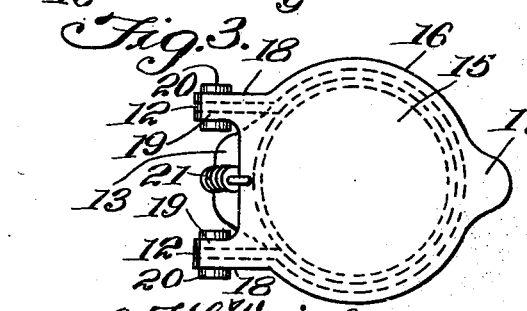
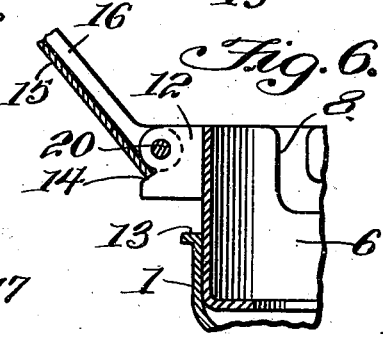
Victor S. McDonough, INVENTOR
BY Victor J. Evans, ATTORNEY
WITNESS: J. L. Wright March 26, 1929.　　V. S. McDONOUGH　　1,707,128
GREASE CUP
Filed Jan. 18, 1928　　2 Sheets-Sheet 2
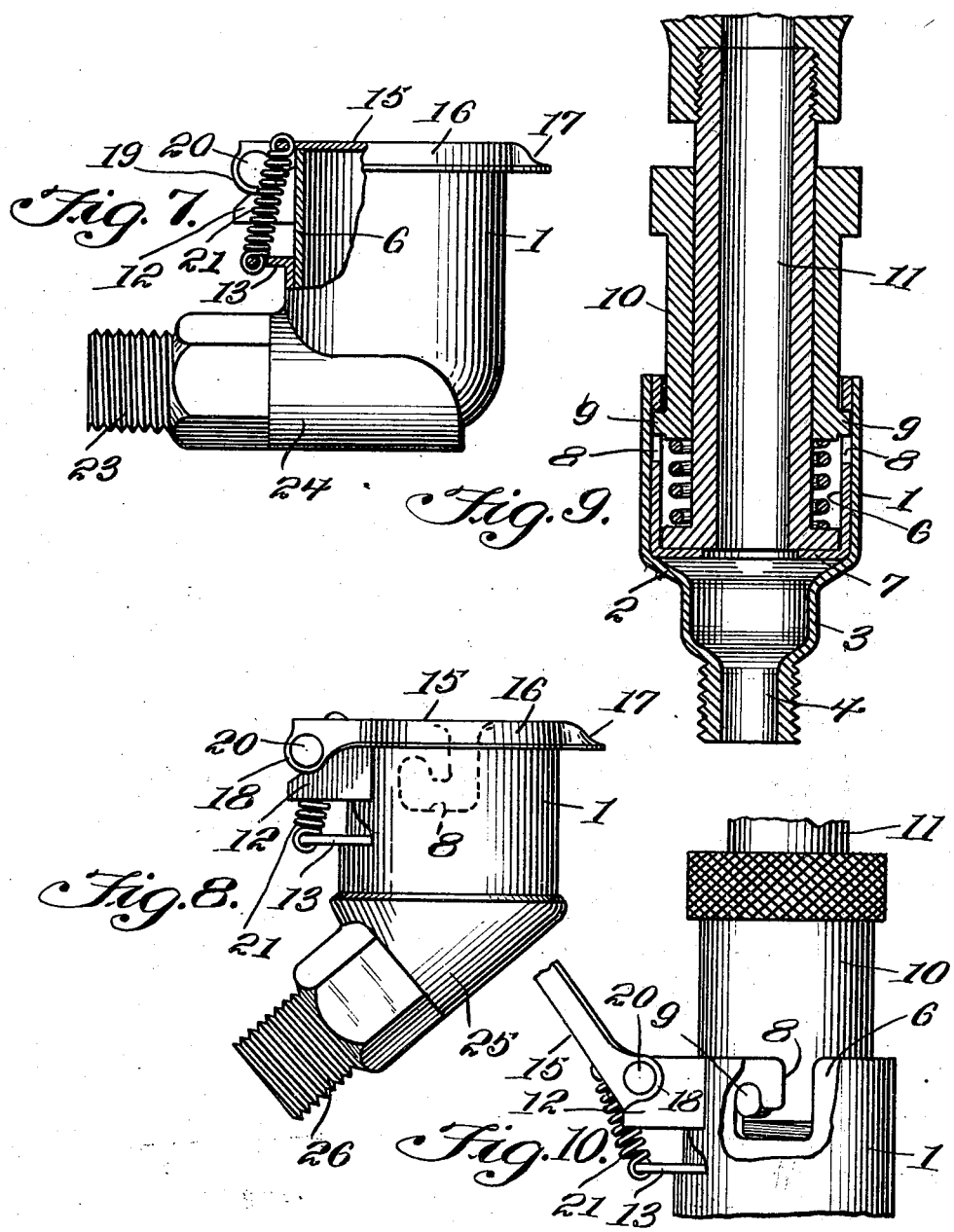

Patented Mar. 26, 1929.

1,707,128

UNITED STATES PATENT OFFICE.

VICTOR S. McDONOUGH, OF RICHMOND, INDIANA.

GREASE CUP.

Application filed January 18, 1928. Serial No. 247,637.

My present invention has reference to a grease or oil cup through which lubricant is fed to a bearing or to a moving part of an automobile or other machine, and the primary object of the invention is the provision of an improved construction of grease cups which will prevent the entrance of dust or foreign matters thereto when the lubricant is being fed into the cup and when the cup is in closed position.

Another object is the provision of a grease cup formed with an inner liner having an inwardly directed continuous flange and formed with key hole slots to receive therein the pins on the sleeve that is slidably mounted on the nozzle of a grease gun, the flange of the liner serving as a stop when inserted in the cup and whereby the free flow of lubricant from the gun into and through the cup will be insured.

A still further object is the provision of a grease cup provided with an inner member or liner that permits of the body of the cup being slitted and the metal bounded by the slit being bent to form side flanges between which the flanged closure for the cup is pivoted and to provide a lower ledge to which one end of the spring that influences and holds the cup in closed position is connected; and which ledge also causes the spring to be arranged at one side of the pivot when the cover is open to hold the said cover in such position and the opposite side of the pivot to urge the closure tightly over the mouth of the cup.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is an approximately central longitudinal sectional view through a combined grease and oil cup in accordance with this invention, the cover being in open position.

Figure 2 is a top plan view thereof.

Figure 3 is a similar view but showing the cover closed.

Figure 4 is a side elevation thereof.

Figure 5 is a detail view looking at right angles to the showing of Figure 4.

Figure 6 is a sectional view approximately on the line 6—6 of Figure 2.

Figures 7 and 8 illustrate side elevations in which the outlet spout or elbows of the cup are arranged at angles and in which these elbows or spouts are separately formed but are welded or otherwise secured to the cup proper.

Figure 9 is a sectional view approximately on the line 9—9 of Figure 2 to illustrate the manner in which the nozzle and the sustaining sleeve for the nozzle are received in the cup.

Figure 10 is a side elevation of the element disclosed in Figure 9, with a portion of the cup broken away to show the pins or studs on the sleeve of the nozzle in the key hole slot of the liner.

As my improved cup comprises a cover and an inner member or liner it will be noted that the same will be of a stronger and sturdier construction than the usual grease or oil cups.

The cylindrical body of the cup is indicated by the numeral 1. This body has its lower end flared inwardly, as at 2, and extended to provide an oil or grease pocket 3. The outer end of the pocket is also flared inwardly and formed with a reduced extension 4 provided with exterior threads and these threads are, of course, to be screwed in the opening for the bearing or other part to be lubricated. The threaded outer end or spout 4 of the cup has preferably an inwardly directed continuous flange 5 so that the outlet through the spout is thus to an extent restricted.

Received in the body of the cup 1 there is a cylindrical or tubular member 6 which provides what I will term an inner liner. The member 6 has one of its ends resting on the shoulder provided by the flared portion 2 of the body of the cup and this end of the liner 6 is formed with an inwardly directed continuous flange 7. The central opening provided by the flange 7, of course, communicates with the receptacle 3.

The liner at the opposite sides thereof, is formed with bayonet slots 8 and as disclosed by Figures 8 and 9 of the drawings, these slots are designed to receive therein lugs or pins 9 formed on a spring influenced sleeve 10 that is arranged for both rotary and longitudinal movement on a nozzle 11 of a grease gun which is connected to the flexible hose of a grease gun. By reference to Figure 9 it will be seen that the end of the nozzle will rest upon the flange 7 of the liner and that its bore is disposed over the central opening provided by the flange 7, so that the grease from the gun will be properly ejected through the nozzle and through the cup onto the bearing to be lubricated. Such lubricant as remains in the compartment 3 and in the nozzle 4 will gravitate onto the bearing and this lubricant is prevented from splashing outwardly through the cup by the flange 7 of the liner 6.

Preferably and as disclosed by the drawings I slit or cut the cup longitudinally and transversely from the mouth end thereof and bend portions of the metal bounded by such splits outwardly to form a pair of spaced parallel flanges or lugs 12 and an outstanding ledge 13 below the said flanges or lugs. Obviously the cup may be otherwise provided with flanges and ledges. The flanges 12 have their outer corners rounded, the said rounded walls merging into an inclined or beveled wall or shoulder 14 whose purpose will presently be understood and appreciated.

The closure of the improvement is broadly indicated by the numeral 15 and has its rounded body portion formed with a continuous flange 16, the flange, at the center of the body, being extended outwardly to provide the same with a lipped portion 17 that affords a grip for the finger of the operator for swinging the closure to either open or closed positions. The flanges 16 are continued for a suitable distance beyond the rear of the closure proper, but such continuations, indicated by the numeral 18, are straight and are in the nature of ears. Other ears 19 are formed on the said rear end of the closure, one of such ears being disposed in close proximity to each of the outer ears 18 and these ears are designed to receive therebetween the rounded or corner portions of the flanges 12 and to have passed through the central openings therein pivot members 20. Each pivot has its ends headed.

Having one end secured centrally to the ledge 13 and its other end secured to the center in the back of the closure 15 there is a coil spring 21. This spring is so arranged that when the closure is swung over the grease cup, the same will be arranged to one side of the pivots 20, and when the closure is swung to open position, and the straight rear edges thereof between the ears 18 and 19 are in contact with the stop shoulders 14, the spring 21 will have moved to the opposite sides of the pivots 20. The result is that the spring holds the closure in both its open and closed position. The shoulders 14 prevent the swinging of the closure beyond a determined angle with respect to the cup.

In Figures 7 and 8 the cup and liner constructions are similar to that above described, but in Figure 7 the outlet or threaded spout 23 is formed with a lubricant receiving receptacle 24 that has one of its faces cut-away to receive the cup therein and which is soldered, welded, or otherwise fixedly secured to the cup. The outlet or spout 23 is thus arranged at a right angle with respect to the cup. In Figure 8 the lubricant receptacle 25 for the threaded outlet or spout 26 is cut at an angle and provides a pocket for the reception of the lubricant cup therein. The member 25 is, of course, either soldered, welded or otherwise securely fixed to the cup and is arranged at an angle of approximately 45° with respect to the cup. Of course, the part 25 may have its mouth arranged at different angles so that the threaded end 26 thereof may be disposed at any desired angle with respect to the cup.

It is believed when the foregoing description has been carefully read in connection with the drawings, the simplicity and advantages of the construction will be understood and appreciated by those skilled in the art to which such invention relates and that further detailed description will not be required.

Having described the invention, I claim:

1. A grease cup having a lower reduced lubricant receptacle which merges into an exteriorly threaded spout, a liner in the cup, having an inner annular flange disposed above the lubricant receptacle and said liner being fixedly secured in the cup, said cup having one of its sides slitted and the metal bounded by the slits bent to form parallel flanges, a ledge between and below said flanges, a closure having ear extensions which are pivotally secured to the flanges, and which closure contacts with said flanges for limiting the opening of the closure, and a spring secured to the ledge and to the closure and movable by the swinging of the closure to the opposite sides of the pivot for holding the closure in open and closed position.

2. A lubricant cup having an inner liner formed on its lower edge with an inwardly directed annular flange and having its sides provided with keyhole slots and a pivotally connected spring influenced closure for the cup and liner.

3. A lubricant cup having laterally extending spaced ears and a ledge below and between said ears, said ears having their outer corners rounded and which corners merge into angle shoulders, a flanged closure having ear extensions which are pivoted to the rounded portions of the flanges and which closure is designed to contact with the angle wall of the flanges when swung to open position and a coil spring connected to the closure and to the ledge and movable by the swinging of the closure to the opposite sides of the pivots, for holding the closure in open and in closed positions.

In testimony whereof I affix my signature.

VICTOR S. McDONOUGH.